United States Patent [19]

Bardin

[11] 3,713,380

[45] Jan. 30, 1973

[54] COOKING UTENSIL

[76] Inventor: Robert S. Bardin, Bayside Village No. 4, 300 East Coast Highway, Newport Beach, Calif.

[22] Filed: April 27, 1970

[21] Appl. No.: 31,929

[52] U.S. Cl. ...................................99/422, 99/425
[51] Int. Cl. ..............................................A47j 37/10
[58] Field of Search........99/113, 422, 425, 426, 430, 99/113, 372; 126/390; 220/20, 20.5, 21, 22

[56] References Cited

UNITED STATES PATENTS

| 664,314 | 12/1900 | Corwin | 99/422 |
| 1,467,272 | 9/1923 | Hazlehurst | 99/425 |
| 1,855,075 | 4/1932 | Virneburg | 99/422 |
| 1,936,551 | 11/1933 | Garrison | 99/425 X |

FOREIGN PATENTS OR APPLICATIONS 350,215   6/1931   Great Britain.........................99/422

*Primary Examiner*—Billy J. Wilhite
*Assistant Examiner*—Arthur O. Henderson
*Attorney*—Smyth, Roston & Pavitt

[57] ABSTRACT

A cooking utensil comprising a bottom wall, a peripheral wall, and a spillway extending along the bottom wall between first and second regions of the peripheral wall to define first and second compartments. At least a section of the spillway is of lesser height than the peripheral wall. The spillway has first and second surfaces confronting the first and second compartments, respectively. The first surface and the bottom wall define a larger included angle than the second surface and the bottom wall.

4 Claims, 3 Drawing Figures

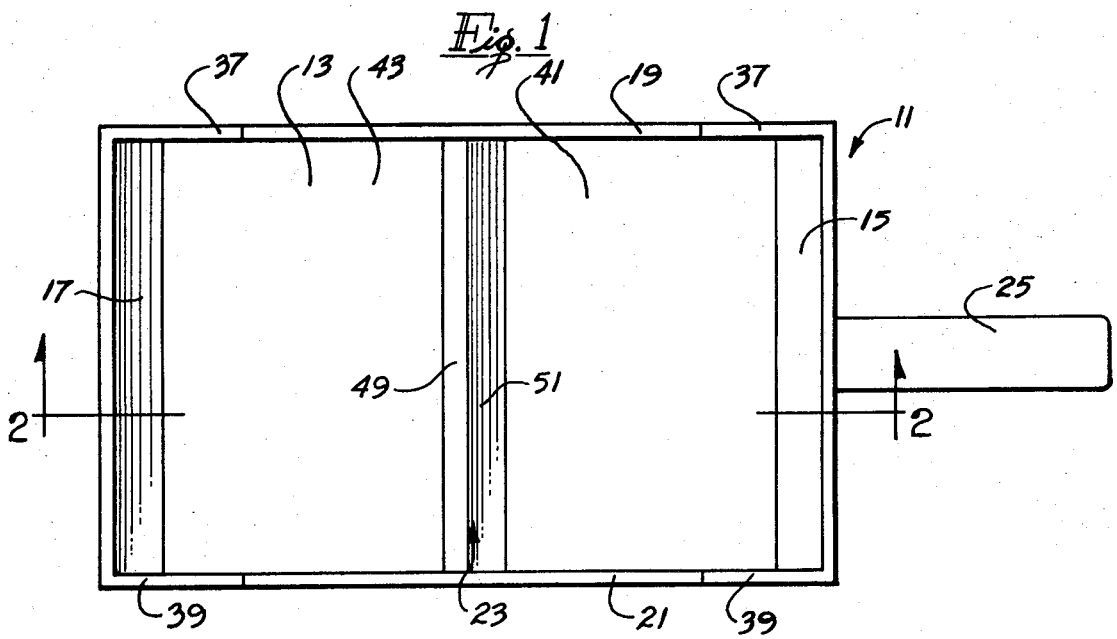
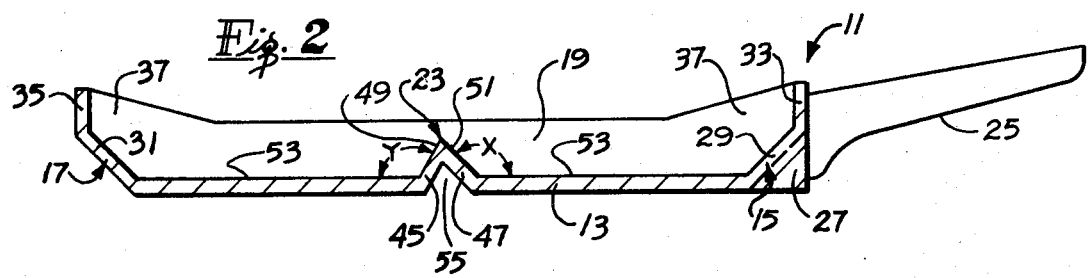
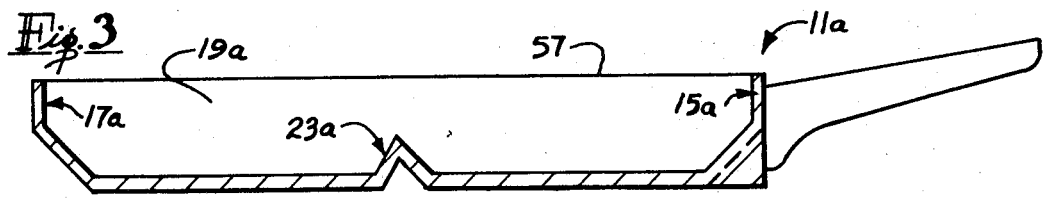

COOKING UTENSIL

A purpose of this invention is to simply the preparation of and to improve the quality of various cooked foods, for example, the preparation of omelets. Under existing methods omelets are prepared in two ways. Under both methods a pourable omelet mix is prepared, using eggs, water, seasonings, etc. Under the most common method the mix is poured into a single-compartment cooking utensil which has been preheated The mix starts to cook as soon as it touches the heated utensil and cooking continues until the desired degree of doneness has been achieved. During the entire cooking period the mix must be stirred and agitated in the utensil. This stirring is time consuming and requires skill and dexterity on the part of the cook and in addition the stirring tends to toughen the omelet.

Under a second method of cooking omelets a prior art utensil is used which includes a pair of half sections hinged together so that each of the half sections forms a cover for the other. The batter is poured into one half section to cook one side of the batter and subsequently the utensil is inverted to cook the opposite side of the batter. While this utensil does a better job than a conventional pan, it is relatively complex and it still does not give the results desired.

The present invention provides a compartmentalized cooking utensil which can be used for general cooking purposes, but which is particularly adapted for cooking omelets. With the present invention, the utensil is heated, and the batter is poured into the first compartment. After the lower regions of the batter have at least partially cooked and become relatively nonflowable, the utensil is tilted to cause the upper regions of the batter, which are still flowable, to flow over the partition or spillway between compartments into the second compartment. The second compartment of the utensil rapidly and evenly heats and cooks this portion of the batter. When all of the batter is properly cooked, it can be easily removed from the utensil as by a rolling operation. At no time during this method of cooking is stirring or agitating necessary on the part of the cook. The procedure is therefore greatly simplified and the tenderness and quality of the cooked omelet greatly improved.

Preferably the cooking utensil includes a bottom wall having an upper surface, a peripheral wall joined to the bottom wall and circumscribing at least a portion of the bottom wall and a spillway extending along the bottom wall between first and second spaced regions of the peripheral wall to define first and second compartments. At least a section of the spillway is of lesser height than the peripheral wall to permit pouring of the batter over the spillway in response to tilting of the utensil without spilling of the batter over the peripheral wall.

To facilitate pouring of batter from the first compartment to the second compartment in response to tilting of the utensil, the spillway has a sloping surface confronting and partially defining the first compartment. Once the batter has been poured over the spillway into the second compartment, it is normally desirable to inhibit or prevent retrograde movement of the batter back into the first compartment even though the utensil may be rocked repeatedly during the cooking operation. To accomplish this, the spillway has a second surface confronting and partially defining the second compartment. The second surface forms a relatively steep angle with the bottom wall. The included angle between the first surface and the bottom wall is larger than the included angle between the second surface and the bottom wall.

Although the spillway could be in the form of a solid bar, e.g., a triangular prism, it is preferred to utilize first and second wall members joined to the bottom wall for forming the spillway. With this construction, each of the wall members can have a thickness substantially equal to the thickness of the bottom wall to thereby provide even heating of the batter in contact with the spillway. This construction also requires the use of less material for the utensil. The first and second surfaces can advantageously substantially intersect at the top of the spillway.

To facilitate removal of the cooked product, the utensil preferably has opposed sloping end walls. The sloping end walls are of particular advantage in rolling an omelet from the utensil.

To minimize the amount of material utilized for the container and to maintain constant wall thickness, the end wall preferably slopes in accordance with the desired slope of the inner surface thereof. Preferably the end wall remote from the handle has a relatively flat sloping surface which can serve as a limiting device for limiting the forward tilting or rocking motion during the cooking operation. At least one of the end walls also preferably has a generally vertical portion to keep the batter within the utensil as it is tilted or rocked during the cooking operation.

Although the utensil can be of various configurations in plan, it is preferred to have the widest portion of the container at the spillway and preferably the side walls are parallel. These factors facilitate pouring of the material over the spillway without danger of spilling of the batter over the peripheral wall and also assure that the batter will be relatively evenly spread in the second compartment following the pouring operation.

The invention, both as to its organization and method of operation together with further features and advantages thereof, may best be understood by reference to the following description taken in connection with the accompanying illustrative drawing.

FIG. 1 is a plan view of a cooking utensil constructed in accordance with the teachings of this invention.

FIG. 2 is a sectional view taken along line 2—2 of FIG. 1.

FIG. 3 is a sectional view similar to FIG. 2 illustrating a second embodiment of the invention.

Referring to the drawings and in particular to FIGS. 1 and 2 thereof, reference numeral 11 designates a cooking utensil constructed in accordance with the teachings of this invention. Generally the cooking utensil 11 includes a bottom wall 13, end walls 15 and 17, side walls 19 and 21, a spillway 23 and a handle 25. All of the utensil except the handle 25 is preferably integrally cast from a suitable metal such as aluminum. The handle 25 may be constructed of a suitable hard plastic material and affixed by fasteners (not shown) to a thickened portion 27 (FIG. 2) of the end wall 15.

As shown in FIG. 1, the bottom wall 13 is rectangular in plan and the side walls 19 and 21 project perpendicularly therefrom. The side walls 19 and 21 and the end walls 15 and 17 define a peripheral wall for the utensil 11 and the peripheral wall is generally rectangular in plan. The side walls 19 and 21 are identical and parallel in the embodiment illustrated.

The end walls 15 and 17 include sloping wall portions 29 and 31, respectively, and vertical extensions 33 and 35. The end walls 15 and 17 are identical except for the presence of the thickened region 27 of the end wall 15. The sloping wall portions 29 and 31 slope upwardly away from the bottom wall 13, and in the embodiment illustrated, form included angles of approximately 135° with the bottom wall 13, it being understood that other angles may be employed. As shown in FIG. 2, the side wall 19 has end portions 37 of increased height to accommodate the extensions 33 and 35. The side wall 21 has similar end portions 39 of increased height (FIG. 1). Thus, the side walls 19 and 21 are of varying height above the bottom wall 13.

The spillway 23 divides the utensil 11 into compartments 41 and 43 which, in the embodiment illustrated, are rectangular and of substantially equal size. The spillway 23 extends perpendicularly between opposed regions of the sidewalls 19 and 21.

The spillway 23 includes generally planar wall members 45 and 47 forming an inverted substantially V-shaped configuration. The wall members 45 and 47 have surfaces 49 and 51, respectively, and the bottom wall 13 has an upper surface 53. The surfaces 49 and 51 intersect at the upper end of the spillway 23. The surfaces 51 and 53 define an included angle X therebetween and the surfaces 49 and 53 define an included angle Y therebetween with the angle X being larger than the angle Y. As shown in FIG. 2, the wall members 45 and 47 are of substantially the same thickness as the bottom wall 13 and they are integral therewith. The wall members 45 and 47 form a groove 55 in the bottom of the utensil 11. In the embodiment illustrated, the spillway 23 is of substantially constant height and is of a lesser height than any region of the side walls 19 and 21 or the end walls 15 and 17.

Although the utensil 11 may be utilized as a compartmentalized utensil, a preferred use of the utensil is in the making of an omelet. In this event, the utensil 11 is preheated to the desired temperature and the batter is placed in the compartment 41 whereupon the lower regions of the batter begin to cook and solidify while the upper regions remain in a liquid state. After only a few seconds in the compartment 29, the user lifts upwardly on the handle 25 to elevate the compartment 41 above the compartment 43 sufficiently to cause all, or a substantial portion of, the liquid component of the batter in the compartment 41 to flow over the spillway 23 and into the compartment 43. The slope of the surface 51 facilitates such pouring movement, and because the peripheral wall is of greater height than the spillway, the batter does not spill out of the utensil. If desired, the utensil may be tipped upwardly until the wall portion 31 is substantially horizontal. Thus, the wall portion 31 forms a limit of a stop for the forward rocking or tilting movement of the utensil 11.

The batter preferably forms a relatively thin layer over the bottom wall 13 and over at least portions of the spillway 23 and the wall portions 29 and 31. If desired, the utensil 11 may be rocked back and forth during the cooking process. The liquid component of the batter which was poured into the compartment 43 rapidly and evenly cooks. Finally, the omelet is rolled out of the utensil 11 from the handle end toward the end wall 17. The slopping wall portions 29 and 31 materially assist the roll out operation. Thus, the omelet is rapidly and evenly cooked without stirring or turning.

A second form of cooking utensil 11a is illustrated in FIG. 3. Portions of the utensil 11a corresponding to portions of the utensil 11 are designated by corresponding reference numerals followed by the letter a. The cooking utensil 11a is identical to the utensil 11 except for the construction of the side walls. Only the side wall 19a is shown in FIG. 3, it being understood that the side wall 21a is identical. The side wall 19a has an upper surface 57 which is horizontal whereas the upper surface of the side wall 19 slopes at the end portions 37. Thus, the side wall 19a is at a greater elevation above the spillway 23a.

Although exemplary embodiments of the invention have been shown and described, many changes, modifications and substitutions may be made by one having ordinary skill in the art without necessarily departing from the spirit and scope of this invention.

I claim:

1. A cooking utensil comprising:
a bottom wall;
a peripheral wall joined to said bottom wall and projecting upwardly therefrom, said peripheral wall including first and second side walls, said side walls appearing generally parallel in plan;
a spillway extending along said bottom wall between generally opposed regions of the side walls, said spillway having a lesser height over substantially the full length thereof than said side walls and dividing the cooking utensil into first and second compartments;
said spillway including first and second wall members joined to said bottom wall and projecting upwardly therefrom to intersect at the top of the spillway, said wall members and said bottom wall being of substantially equal thickness, said first wall member having a sloping surface confronting and partially defining the first compartment;
a handle mounted on a region of the peripheral wall bounding said first compartment;
said second wall member having a second surface confronting and partially defining the second compartment, said first wall member forming a first included angle with said bottom wall and said second wall member forming a second included angle with said bottom wall, said first included angle being larger than said second included angle; and
said peripheral wall including an end wall including a sloping wall portion sloping upwardly from the bottom wall and a relatively straight wall portion extending substantially transversely to said bottom wall above said sloping wall portion.

2. A cooking utensil as defined in claim 1 wherein said first and second wall members are generally planar.

3. A cooking utensil as defined in claim 2 wherein the portions of said bottom wall in said compartments are substantially coplanar.

4. A cooking utensil comprising:
a bottom wall having an upper surface;

a peripheral wall joined to said bottom wall and projecting upwardly therefrom, said peripheral wall including first and second side walls, said side walls appearing generally parallel in plan;

a spillway extending along said bottom wall between generally opposed regions of the side walls, said spillway having a lesser height over substantially the full length thereof than said side walls and dividing the cooking utensil into first and second compartments of substantially equal size;

said spillway including first and second generally planar wall members joined to said bottom wall and projecting upwardly therefrom to intersect at the top of the spillway, said wall members and said bottom wall being of substantially equal thickness, said first wall member having a sloping surface confronting and partially defining the first compartment;

the section of said bottom wall in said first compartment being at substantially the same elevation as the section of said bottom wall in said second compartment;

said first compartment having an end wall portion, said end wall portion forming an included angle of substantially greater than 90 degrees with the upper surface of said bottom wall; and a handle mounted on a region of the peripheral wall bounding said second compartment and opposite said end wall portion.

* * * * *